Figure 1:
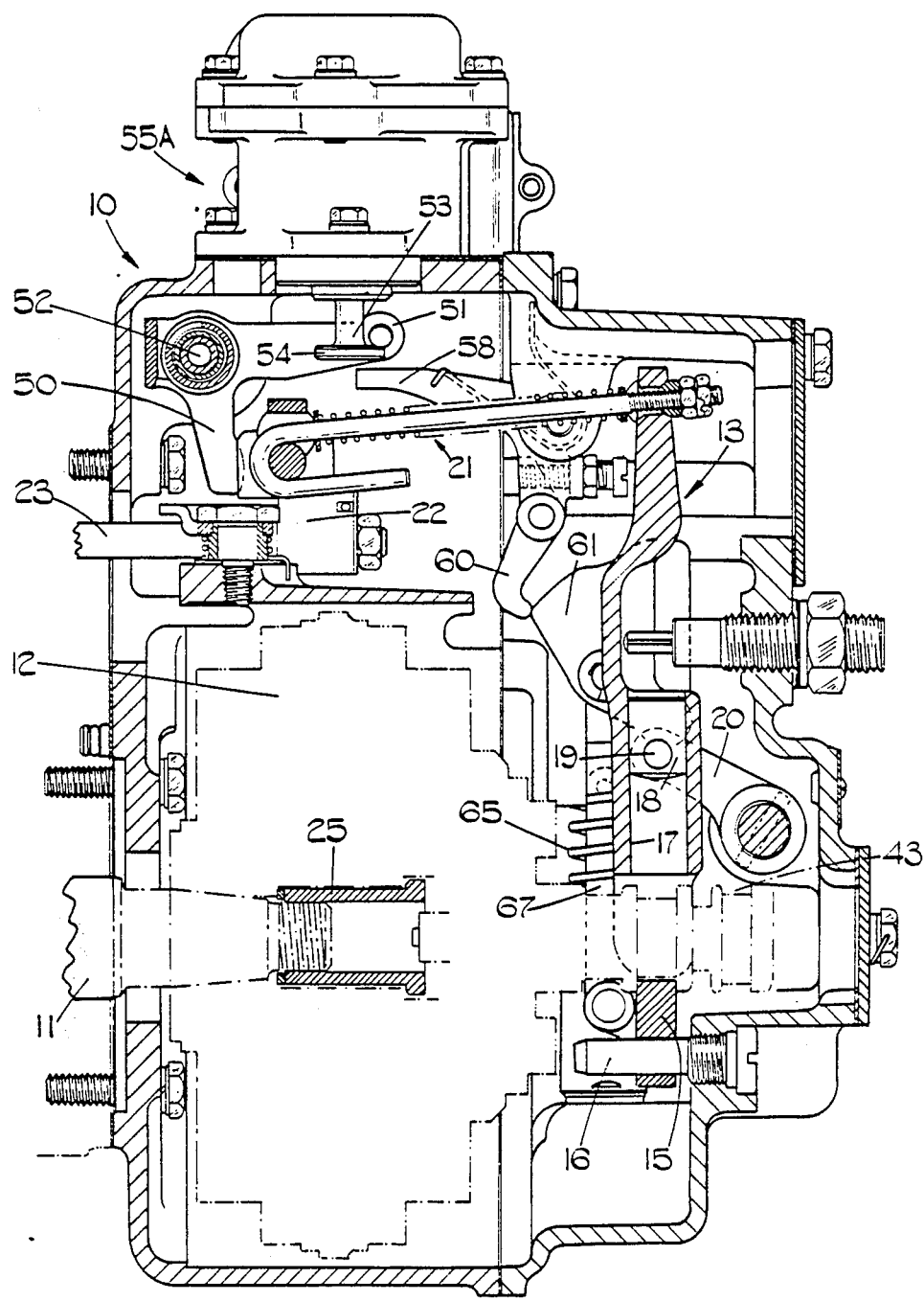

United States Patent [19]

Pruneda

[11] Patent Number: 4,694,795
[45] Date of Patent: Sep. 22, 1987

[54] GOVERNOR MECHANISM

[75] Inventor: Domingo C. Pruneda, Barcelona, Spain

[73] Assignee: Lucas Industries Public Limited Company, Birmingham, England

[21] Appl. No.: 825,654

[22] Filed: Feb. 3, 1986

[30] Foreign Application Priority Data

Feb. 6, 1985 [ES] Spain .................................. 540.158

[51] Int. Cl.⁴ .......................................... F02M 39/00
[52] U.S. Cl. ..................................... 123/373; 123/383
[58] Field of Search ............ 123/373, 382, 383, 179 L, 123/365, 387

[56] References Cited

U.S. PATENT DOCUMENTS

| 2,767,700 | 10/1956 | Parks | 123/383 |
| 3,015,326 | 1/1962 | Wirschioo | 123/382 |
| 4,085,724 | 4/1978 | Djordjevic | 123/382 |
| 4,227,504 | 10/1980 | Ritter | 123/383 |
| 4,508,080 | 4/1985 | Nakamura | 123/373 |
| 4,512,308 | 4/1985 | Hofer | 123/387 |
| 4,519,352 | 5/1985 | Eheim | 123/373 |

FOREIGN PATENT DOCUMENTS 2309844  9/1973  Fed. Rep. of Germany ...... 123/373

Primary Examiner—Carl Stuart Miller
Attorney, Agent, or Firm—Balogh, Osann, Kramer, Dvorak, Genova & Traub

[57] ABSTRACT

A governor mechanism for attachment to an engine fuel supply pump is of the two speed type having a weight mechanism 12 which has an output member which moves in response to speed throughout the speed range of the engine. This output member provides an input signal to a follow up servo mechanism which position a cam 61. The cam surface is engaged by a lever 60 which is utilized to position the maximum fuel stop 50 of the governor mechanism. The effort required to move the control rod 23 is provided by the weight mechanism.

8 Claims, 10 Drawing Figures

GOVERNOR MECHANISM

This invention relates to a governor mechanism for attachment in use to a fuel injection pump used to supply fuel to an internal combustion engine, the governor mechanism being of the so-called "two speed" type and including a centrifugal weight mechanism, a pivotal lever coupled to the weight mechanism and to an output member which in use is connected to a fuel control rod of the pump, the mechanism including a manually operable member connected to an adjustable pivot for the lever, and the governor mechanism including resilient means opposing movement of the centrifugal weight mechanism, the arrangement being such that the governor mechanism will control the idling speed and the maximum speed of the associated engine, the rate of fuel supply intermediate these speeds being controlled by the position of said manually operable member, the mechanism further including a maximum fuel stop to limit the maximum rate at which the fuel can be supplied to the associated engine.

The purpose of the maximum fuel stop is to ensure that no more than a predetermined level of smoke appears in the engine exhaust. With a turbo supercharged engine the amount of fuel which can be supplied to the engine while still maintaining the desired level of smoke will vary depending upon the pressure of air in the inlet manifold of the engine. To a lesser extent the maximum amount of fuel which can be supplied to a normally aspirated engine depends upon the engine speed. It is therefore necessary to be able to modify the maximum amount of fuel which can be supplied to the engine at least in accordance with the engine speed and one aspect of the invention resides is to provide for adjustment of the maximum fuel stop in accordance with speed.

For starting purposes the maximum fuel stop must be temporarily disabled to enable the fuel injection pump to supply an amount of fuel in excess of the maximum amount of fuel which is allowed during normal operation of the engine. This disablement of the maximum fuel stop can be achieved by manual means but it is essential to arrange that once the associated engine has started, the maximum fuel stop should be brought back into operation otherwise damage may be caused to the engine, and/or excessive smoke will appear in the engine exhaust. It is therefore preferred that the disablement of the stop should be achieved automatically and the governor mechanism should include an arrangement for automatically returning the stop to its normal position once starting of the engine has been achieved. Another aspect of the invention is therefore to provide a mechanism for setting the maximum fuel stop.

According to one aspect of the invention in a governor mechanism of the kind specified said weight mechanism includes a further output member which moves in accordance with the speed at which the mechanism is driven, a fluid pressure operable servo responsive to the movement of said further output member, a cam the position of which is varied by said servo and a lever mechanism including a follower engaging said cam, said lever mechanism acting to determine the setting of said maximum fuel stop.

According to another aspect of the invention in a governor mechanism of the kind specified comprises a piston coupled to said maximum fuel stop, a cylinder in which said piston is slidable, passage means through which fluid under pressure can be supplied to one end of the cylinder to effect movement of the maximum fuel stop to its normal position against the action of a spring.

Figure 2:
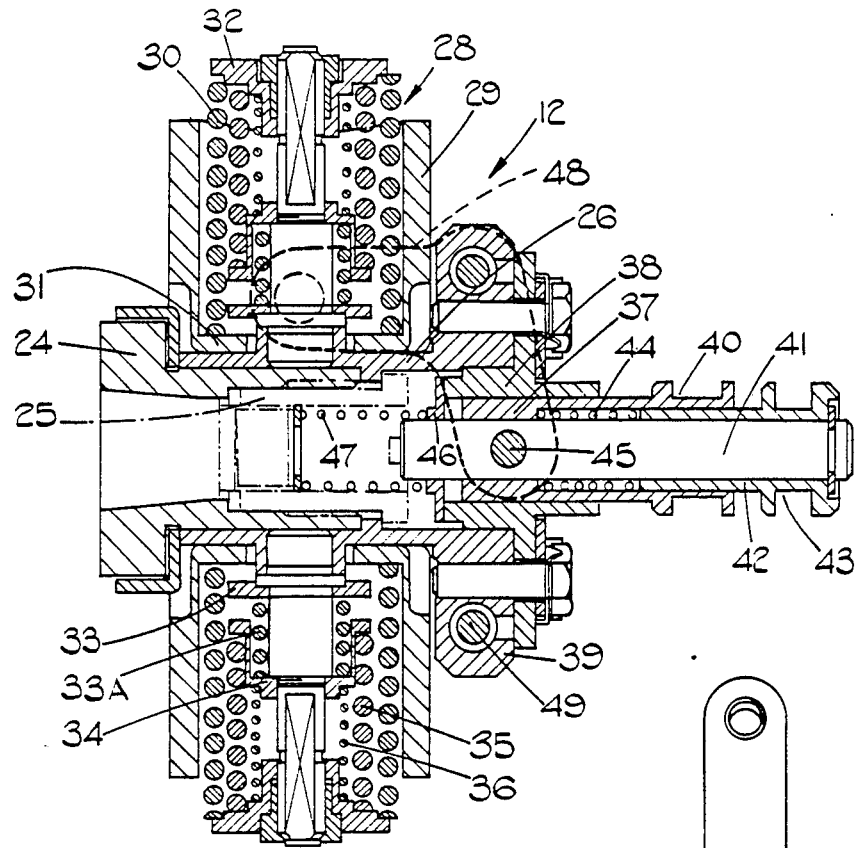
Figure 4:
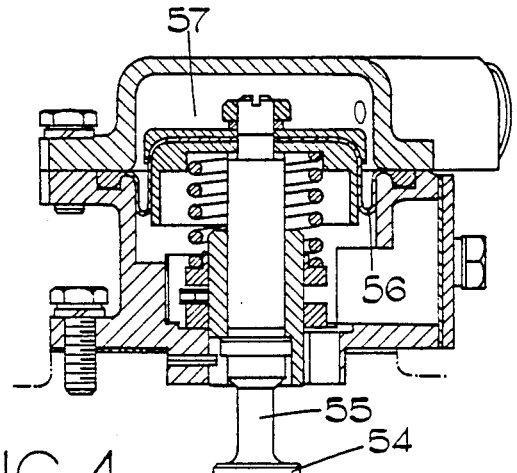
Figure 3:
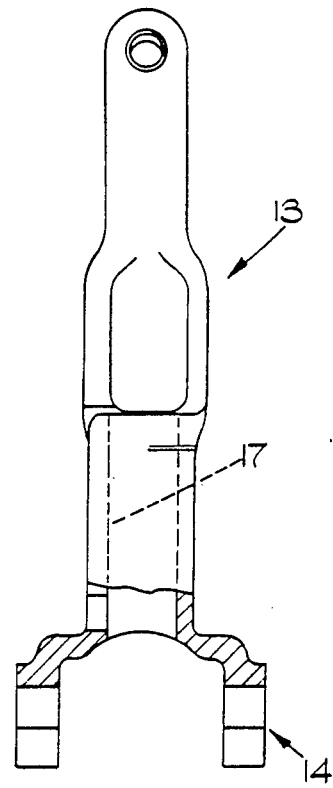
Figure 5:
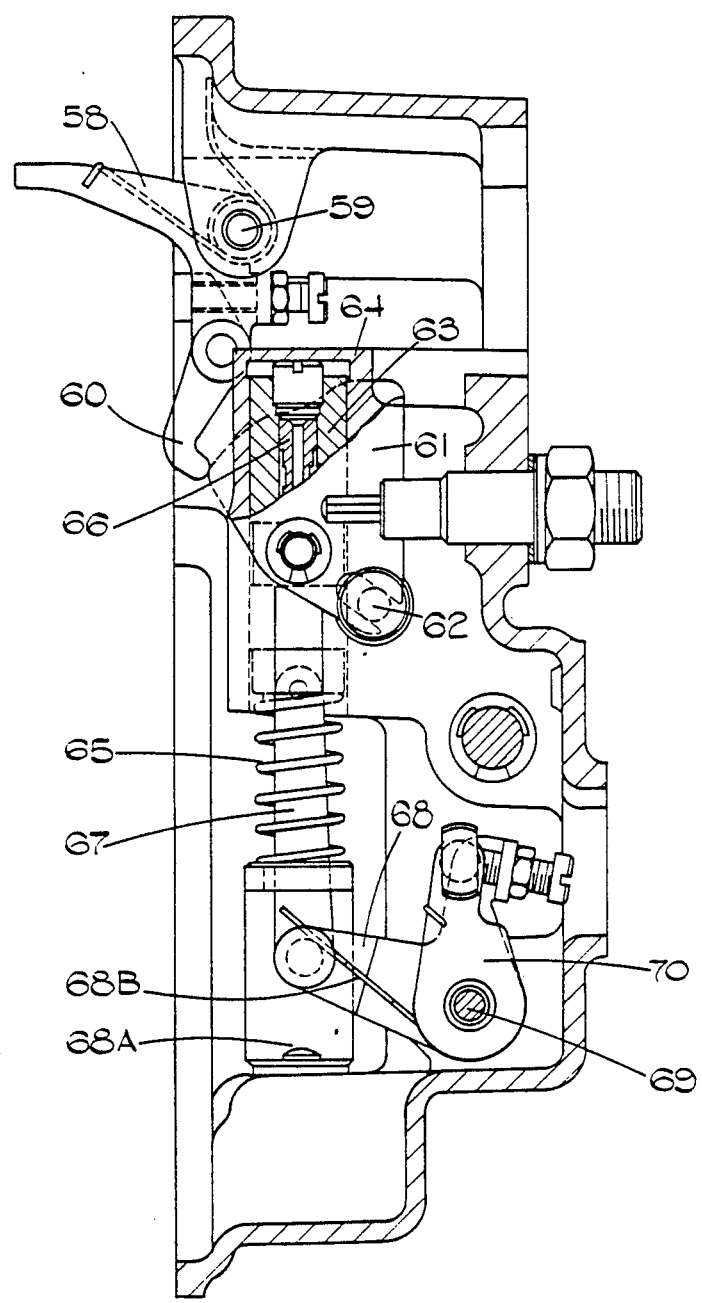
Figure 6:
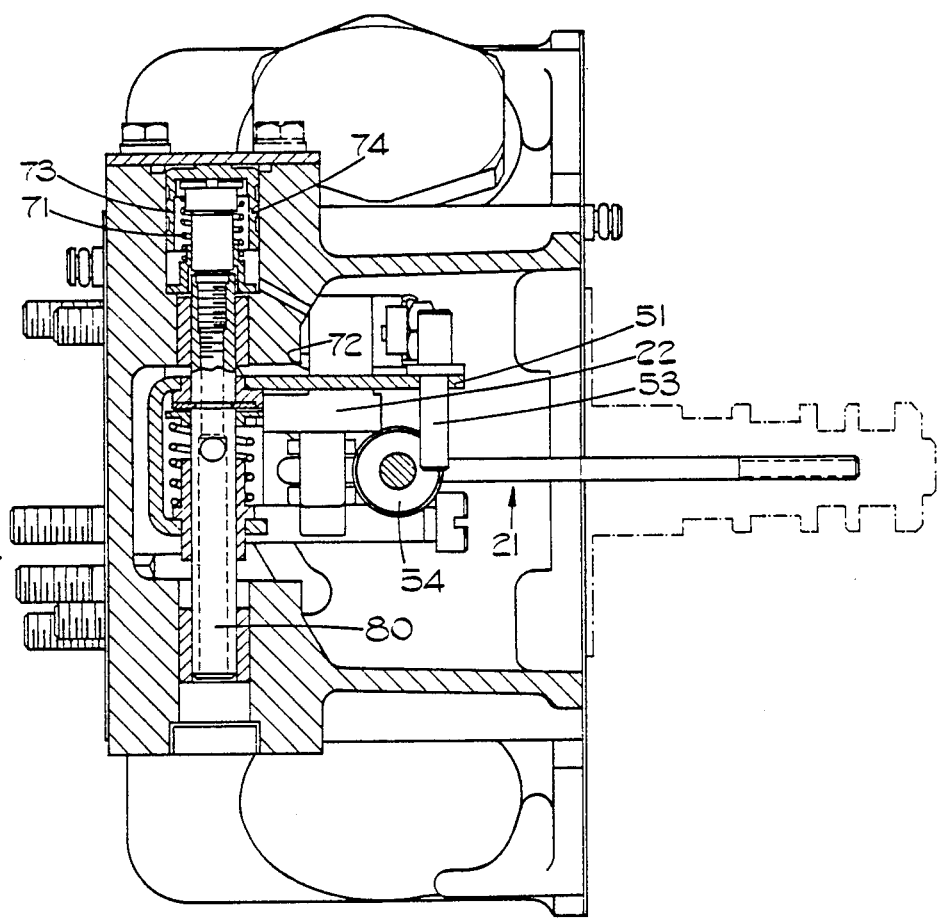
Figure 7:
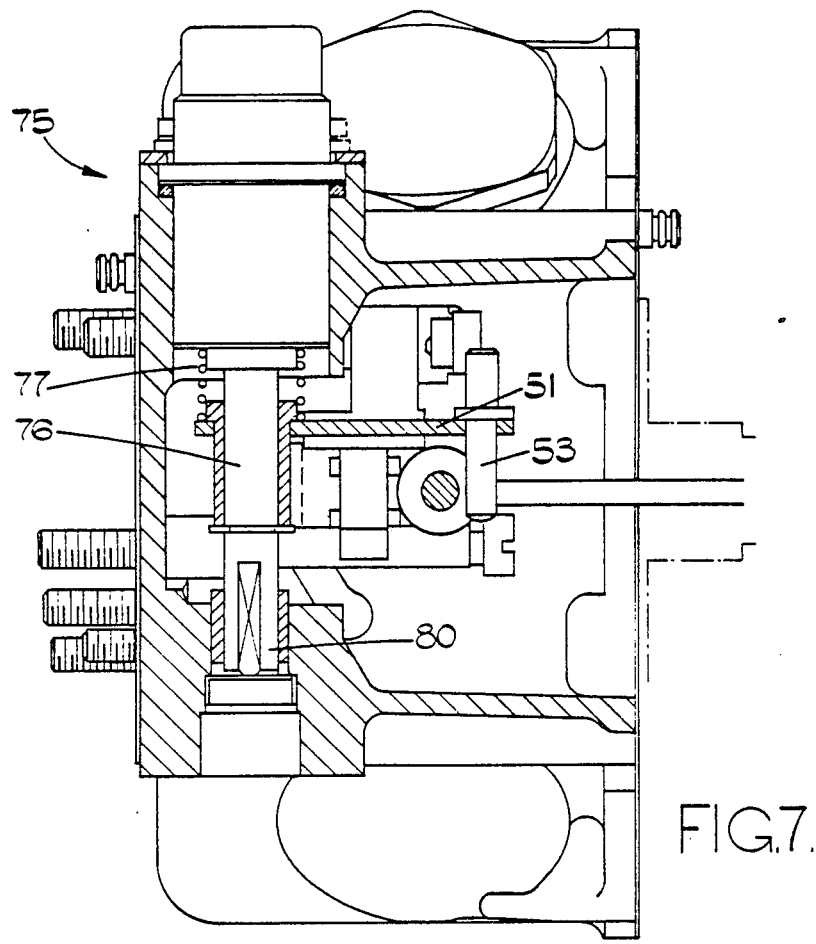
Figure 8:
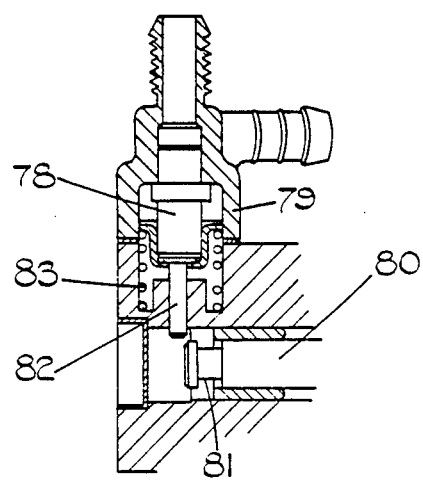
Figure 9:
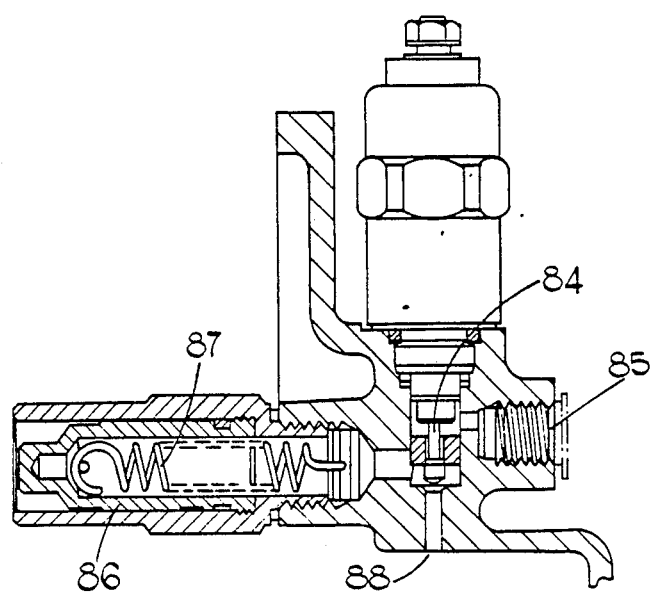
Figure 10:
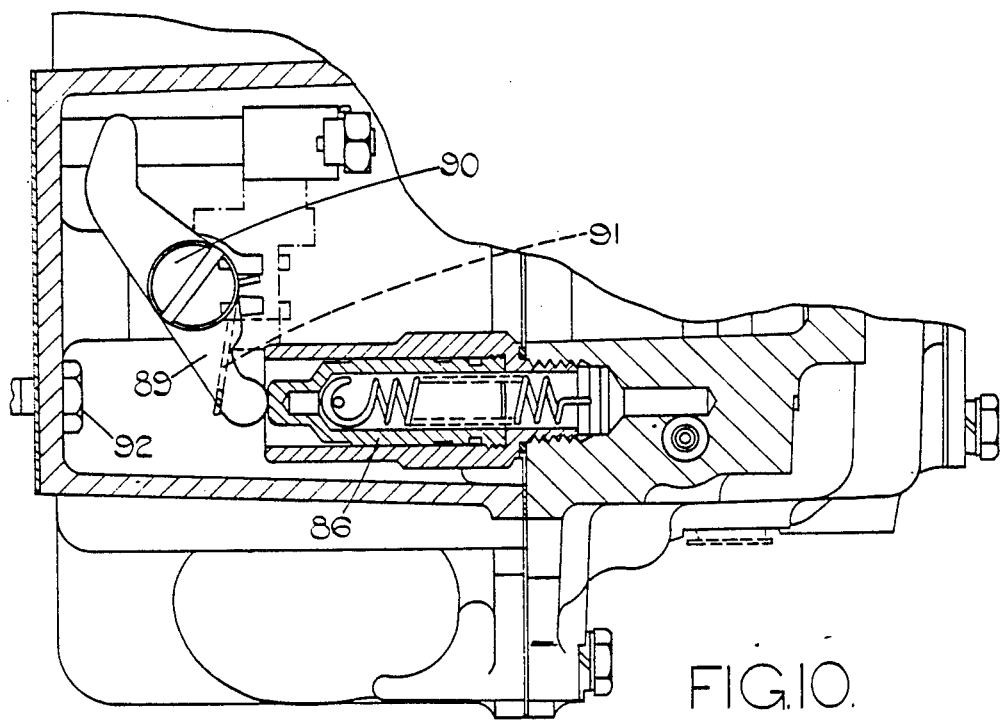

An example of a governor mechanism in accordance with the invention will now be described with reference to the accompanying drawings in which:

FIG. 1 is a sectional side elevation through the mechanism with parts of the mechanism in outline only, FIG. 2 is a sectional side elevation of a weight mechanism which is shown in outline in FIG. 1, FIG. 3 is an end elevation of part of the mechanism seen in FIG. 1, FIG. 4 is a sectional side elevation of part of the mechanism which is shown in outline in FIG. 1, FIG. 5 is a sectional side elevation of a portion of the mechanism of FIG. 1 with parts removed for the sake of clarity, FIG. 6 is a sectional plan view of part of the mechanism seen in FIG. 1, FIG. 7 is a view similar to FIG. 6 showing a modification, and FIGS. 8, 9 and 10 are further sectional views showing minor details of construction.

With reference to FIG. 1 of the drawings the governor mechanism is located in a housing 10 which in use will be secured to the housing of the associated pump. A drive shaft 11 extends into the housing 10, the drive shaft being an extension of the cam shaft of the pump. The shaft within the housing carries a weight mechanism shown in outline at 12 and which will be described with reference to FIG. 2.

Mounted within the housing 10 is a pivotal lever 14 an end view of which is seen in FIG. 3. The lower end of the lever is bifurcated to define a pair of legs 14 which are apertured and are pivotally mounted on a support block 15 which is slidable on a pin 16 carried by the housing. Intermediate its ends the lever is shaped to define a cylindrical elongated guide surface 17 in which is located a plunger 18. Formed in the guide surface is a slot through which extends a peg 19 engaged within the plunger the peg being mounted on a lever 20 which is coupled to a manually operable lever on the exterior the housing. At its upper end the lever 13 is coupled to a linkage 21 which in turn is coupled to a block 22 mounted on a control rod 23 which is connected to the fuel quantity control elements of the pump.

The weight mechanism 12 comprises a sleeve 24 having a tapered bore to receive the shaft 11 and is retained upon the shaft by means of a nut 25 shown in ouline in FIG. 2. The nut is provided with a flange between which and the end of the sleeve 24 is located a rim formed on the internal surface of the wall of a bore formed in a weight support 26. The weight support mounts a pair of radial pins 27 about which are located spring assemblies 28 the latter being surrounded by weights 29. Each spring assembly includes a first spring 30 located between an inwardly extending flange 31 of the weight and a spring abutment plate 32. The assembly includes a second spring 33A which is located between first and second abutment plates 33, 34, the first plate 33 being spaced outwardly from the flange 31 and the second plate 34 being urged against a step defined on the pin by a spring pack comprising springs 35 and 36.

The governor mechanism includes a first output member in the form of a sleeve 37 slidable in a bush 38 which is secured to a mouning 39 forming part of the weight support 26. The sleeve 37 is provided with a groove 40 in which is engaged the support block 15 as shown in FIG. 1. The weight mechanism has a second output member in the form of a rod 41 which is surrounded by a sleeve 42 having a groove 43 formed therein. The sleeve 42 is located on the rod by a circlip and interposed between the sleeves 37 and 42 is a coiled compression spring 44.

The rod 41 mounts a cross pin 45 which passes through open ended grooves in the bush 38 so as to allow movement of the rod and cross pin towards the left as seen in FIG. 2. The sleeve 37 is also provided with open ended slots and in the rest position as shown in FIG. 2 the bases of these slots are pressed into engagement with the cross pin 45 by the spring 44.

The rod 41 has an abutment plate 46 slidable thereon this plate being biased by a spring 47 into engagement with the end of the bush 38. Also provided are four bellcrank levers, the outline of one of the levers being seen at 48 in FIG. 2. Each weight 29 has two levers associated with it, the levers being located on opposite sides of the axis of the shaft 11. The levers are pivoted intermediate their ends on pins 49 secured in the mounting 39, one end of each lever being pivotally connected to the cross pin 45 and the other ends of the levers being pivotally connected to the respective weights 29.

The operation of the governor mechanism thus far described is as follows. As illustrated the mechanism is at rest however when the engine has been started, the weights 29 will move outwardly under the action of centrifugal force, the movement being opposed by the respective spring assemblies. If the lever 20 is positioned in the engine idling position, the weights will move in the idling range and their outward movement will be opposed only by the first springs 30. The idling range extends from the innermost position as shown to the position in which the flanges 32 engage the first abutment plates 33. During outward movement of the weights in this range the levers 48 urge the rod 41 and sleeve 42 towards the left and the sleeve 37 or first output member follows this movement under the action of the spring 44. When the flanges of the weights engage the abutment plate 33 it is arranged that the sleeve 37 engages the abutment 46. Movement of the sleeve 37 towards the left effects movement of the lower end of the the pivotal lever 13 towards the left causing the lever 13 to pivot about the peg 19 in a clockwise direction. This movement of the lever is imparted by way of the linkage 21 to the block 22 to effect movement of the control rod to decrease the amount of fuel supplied by the pump. If the engine speed should fall then movement of the various parts takes place in the opposite directions and the idling speed of the engine is controlled.

An increase in engine speed above its idling speed is effected by moving the lever 20 in the anticlockwise direction and this causes the lever 13 to move in the anticlockwise direction about its pivotal connection with the support block 15. As a result the control rod 23 is moved in a direction to increase the rate of fuel supply to the engine with the result that the engine speed increases. With an increase in engine speed above the idling speed the weights move outwardly against the action of the first and second springs 30, 33A. This further outward movement of the weights results in axial movement of the sleeve 37 which remains in engagement with the abutment 46.

When the abutments 33 and 34 engage with each other further movement of the weights takes place against the action of the spring 30 and the springs 35 and 36. During this range of movement the rod 41 continues to move and causes clockwise movement of the lever leading to a reduction in the quantity of fuel supplied by the associated pump. In this range of movement the maximum speed of the associated engine is controlled.

The movement of sleeve 42 is utilized to control the setting of a maximum fuel stop this being constituted by a lever 50 which is engageable by the block 22. The lever 50 is coupled to a further lever 51 the two levers are pivotally mounted about the axis 52. The lever 51 mounts a pin 53 which can engage a mushroom shaped head 54 carried by the output member 55 of an air pressure sensor 55A which is shown in greater detail in FIG. 4. The output member 55 includes a diaphragm 56 which forms one wall of a chamber 57, the chamber being connected in use to the inlet manifold of the associated engine. The output member 55 is moved by air under pressure in the chamber 57 against the action of a spring. With an increasing air pressure the head 54 is moved downwardly to allow the block 22 to be moved further towards the left allowing an increased quantity of fuel to be supplied to the associated engine, this characteristic being required for a turbo supercharged engine.

In order to control the maximum torque which can be developed by the engine the pin 53 can be engaged by a lever 58 which is pivotal about an axis 59. The lever 58 is adjustably coupled to a further lever 60 which is engageable with the surface of a cam 61 which is pivotable about an axis 62. The cam is movable about the axis 62 by means of a piston slidable within a cylinder 64. The piston is provided with a lateral pin which extends into an aperture in the cam so that movement of the piston will cause angular movement of the cam 61. The piston is biased by a spring 65 and it is hollow. Slidable within the piston is a servo valve member 66 which is coupled by means of a link 67 to the lever 68. The lever 68 can be pivoted about an axis 69 and is adjustably coupled to a further lever 70 which carries a pin which is located within the groove 43. The servo valve member 66 controls the admission of fluid under pressure to the closed end of the cylinder and as the servo valve member is moved downwardly as occurs with increasing speed, the piston 63 will follow the movement of the valve and cause the cam 61 to be moved in the anticlockwise direction about the axis 62. The piston 63 and the servo valve member form a follow up servo mechanism.

The lever 60 is biased into engagement with the surface of the cam 61 by the action of a spring associated with the lever 58. As a result the lever 58 is positioned in accordance with the profile of the surface of the cam 61 and it therefore acts to limit the movement of the actual stop lever 50. In this manner the maximum amount of fuel which can be supplied by the associated pump in the engine working range between idling and maximum speed varies in accordance with the speed of the associated engine. It will of course be understood that the actual amount of fuel supplied by the pump will depend upon the setting of the lever 20. If the associated engine is not provided with a supercharger or a turbocharger the air pressure sensor 55A will be of a different type or may be omitted.

The extent of movement of the lever 68 is limited by a stop 68A and to allow continued movement of the lever 70 once the movement of the lever 68 has been halted an overtravel spring 68B is provided between the levers.

In order to provide an excess of fuel for starting purposes the lever 50 is movable axially in the direction of the axis 52. As seen in FIG. 6, the lever 51 from which the lever 50 depends, is in the so-called excess fuel position. It is urged to this position by a light spring 71 and in this position the lever 50 is aligned with a recessed surface 72 of the block 22 thereby allowing the block to move further to the left to increase the amount of fuel supplied by the associated pump. Once the engine has started the levers 50 and 51 are restored to the normal position by fluid under pressure acting upon a piston 73 contained within a cylinder 74. One end of the cylinder is connected to a source of fluid pressure which develops as soon as the associated engine has started and the other end of the cylinder is vented to the interior of the housing of the mechanism. It is essential to ensure that the piston cannot return to the excess fuel position when the engine is in use. The piston for this purpose may be double acting with the pressures in the one end of the cylinder being greater so as to provide a differential force on the piston. When the pressure difference increases to a sufficient value the piston will move against the spring and it can be arranged that the piston cuts off the flow of fluid to the other end of the cylinder once the full movement of the piston has taken place. As an example the one end of the cylinder can be supplied with fluid from the source and the other end of the cylinder from the source through a restricted passage means with a restricted drain from the other end of the cylinder. The piston closes the restricted passage means once the full range of movement has taken place.

FIG. 7 shows an arrangement in which the selection of excess fuel for starting the associated engine is achieved by energising an electromagnetic actuator 75, the latter having an output member 76 which supports the lever 51. In this case a spring 77 urges the lever 51 to the normal fuel position and an electrical switch must be provided to ensure that the actuator is deenergised once the engine is running.

For example, the actuator may be connected in circuit with the engine starter motor and therefore be energised whenever the starter switch is operated. Both the mechanisms as shown in FIG. 6 and in FIG. 7 will act to cause excess fuel flow to the engine irrespective of whether the engine is hot or cold. When the engine is hot, the injection pump need not provide an extra flow of fuel, because the normal operating flow of fuel will be sufficient to allow engine starting. Consequently, if the engine is hot, it must be possible to put out of action the cold starting mechanism.

In order to achieve this object the governor mechanism is provided in the top part of the housing, as shown in FIG. 8, with a mechanism including a temperature responsive capsule 78 located in a body 79 having an inlet and an outlet for engine cooling water. The operation of this mechanism is as follows: When it is desired to start the engine from cold, the mechanism including the pin 80, as shown in FIGS. 6 and 7, is in contact with its upper stop, that is to say allowing the injection pump to supply an excess of fuel to the engine for starting. Once starting has been effected, the pin will move to the left from the position shown in FIG. 8, to assume the position in which a slot 81 in the pin faces the output member 82 of the capsule. As the engine water heats up, the capsule 78 starts to react, thus forcing the output member 82 to extend from its housing, overcoming the force of a spring 83, and to enter into the groove 81 in the pin 80. If under these conditions the engine is stopped, the movement of the rod 80 will be blocked by the output member 82 thereby preventing the supply of excess fuel. It will be necessary for the temperature of the water to fall sufficiently to retract the output member before excess fuel can be supplied to the engine.

The regulator also incorporates a shutdown mechanism connected to the main engine control switch and which uses, as its source of power, compressed air from the vehicle braking system. As shown in FIGS. 9 and 10: an electromagnetic valve 84 is connected to the control switch and when the switch is in the engine run setting, prevents air under pressure from a supply duct 85 from passing into a cylinder containing a piston 86. The latter is in its most retracted position as a consequence of the tension applied by a restoring spring 87, and an exhaust duct 88 is provided for decompressing the cylinder. When the switch is moved to the stop position, the valve member closes the duct 88 and transmits air under pressure to the piston 86, which moves outwardly. The manner in which shutdown is achieved under these conditions is the result of the action of a lever 89, which pivots about a screw 90 and is always in contact at one end with the head of the piston 52 by virtue of a torsion spring 91. The other end of the lever occupies a position at the same level as the guide block 22, and allows the latter to move to any position without interference. When the piston 86 moves out of its cylinder, it pivots the lever 89 into engagement with the guide block 22, and moves the latter to the zero fuel flow position. A stop 92 is provided to limit the movement of the lever.

Another way which can be used to cut off the supply of fuel by the pump involves the external idling stop for the lever 20. It, because of an internal spring, allows lever 20 to be moved to a position to displace the lever 13 and the control rod, through the flexible connection 21, can be moved to the zero fuel position.

I claim:

1. A governor mechanism for attachment to a fuel injection pump for an internal combustion engine, the governor mechanism being of the two speed type and comprising a centrifugal weight mechanism, a pivotal lever coupled to the weight mechanism and to an output member which in use is connected to a fuel control rod of the pump, the mechanism including a manually operable member connected to an adjustable pivot for the lever, and the governor mechanism including resilient means opposing movement of the centrifugal weight mechanism, the arrangement being such that the governor mechanism will control the idling speed and the maximum speed of the associated engine, the rate of fuel supply intermediate these speeds being controlled by the position of said manually operable member, the mechanism further including a maximum fuel stop to limit the maximum rate at which fuel can be supplied to the associated engine, said weight mechanism including a further output member which moves in accordance with the speed at which the mechanism is driven, a fluid pressure operable servo responsive to the movement of said further output member, a cam the position of which is varied by said servo and a lever mechanism including a follower engaging said cam, said lever mechanism acting to determine the setting of said maximum fuel stop, wherein the servo includes a piston coupled to said cam, and a servo valve member slidable within said piston for controlling the application of fluid under pressure to said piston, said piston and said valve member forming a follow up servo mechanism.

2. A mechanism according to claim 1 including a stop to limit the movement of the servo valve member and a yieldable coupling interposed between the further output member and the servo valve member whereby the output member can continue to move after the movement of the servo valve member has been halted.

3. A mechanism according to claim 2 including resilient means acting on said piston to oppose the movement thereof by fluid under pressure.

4. A mechanism according to claim 1 including means for displacing said maximum fuel stop to a position to allow an excess of fuel to be supplied by the pump.

5. A mechanism according to claim 1 including air pressure responsive means for setting said maximum fuel stop in accordance with the pressure of air supplied to an air inlet manifold of the associated engine.

6. A governor mechanism for attachment to a fuel injection pump for an internal combustion engine, the governor being of the so-called "two speed" type and comprising a centrifugal weight mechanism, a pivotal lever coupled to the weight mechanism and to an output member which in use is connected to a fuel control rod of the pump, the mechanism including a manually operable member connected to an adjustable pivot for the lever, and the governor mechanism including resilient means opposing movement of the centrifugal weight mechanism, the arrangement being such that the governor mechanism will control the idling speed and the maximum speed of the associated engine, the rate of fuel supply intermediate these speeds being controlled by the position of said manually operable member, the mechanism further including a maximum fuel stop to limit the maximum rate at which fuel can be supplied to the associated engine, a piston coupled to said maximum fuel stop, a cylinder in which said piston is slidable, passage means through which fluid under pressure can be supplied to one end of the cylinder to effect movement of the maximum fuel stop to its normal position against the action of a spring, including further passage means providing restricted communication between said one end of the cylinder and the other end thereof, a restricted outlet from the other end of the cylinder and valve means operable to close said further passage means after a predetermined movement of the piston against the action of the spring.

7. A mechanism according to claim 6 including means responsive to the temperature of the associated engine for maintaining the maximum fuel stop in the normal fuel position until following the stopping of the engine, the engine cools to a temperature at which excess fuel is required for starting.

8. A mechanism according to claim 4 including air pressure responsive means for setting said maximum fuel stop in accordance with the pressure of air supplied to an air inlet manifold of the associated engine.

* * * * *